United States Patent [19]
Dawson

[11] Patent Number: 4,663,707
[45] Date of Patent: May 5, 1987

[54] MULTILEVEL BOOTSTRAP APPARATUS

[75] Inventor: Daniel A. Dawson, Santa Clara, Calif.

[73] Assignee: Scientific Micro Systems, Inc., Mountain View, Calif.

[21] Appl. No.: 614,257

[22] Filed: May 25, 1984

[51] Int. Cl.⁴ .......................... G06F 9/24; G06F 13/00
[52] U.S. Cl. .................................................... 364/200
[58] Field of Search ... 364/200 MS File, 900 MS File; 365/230, 226, 189

[56] References Cited

U.S. PATENT DOCUMENTS

| | | | |
|---|---|---|---|
| 4,070,704 | 1/1978 | Calle et al. | 304/200 |
| 4,244,032 | 1/1981 | Oliver | 364/900 |
| 4,392,208 | 7/1983 | Burrows et al. | 364/900 |
| 4,419,737 | 12/1983 | Yamaura et al. | 364/900 |
| 4,430,704 | 2/1984 | Page et al. | 364/200 |
| 4,481,578 | 11/1984 | Hughes et al. | 364/200 |

Primary Examiner—Archie E. Williams
Assistant Examiner—William G. Niessen
Attorney, Agent, or Firm—Fliesler, Dubb, Meyer & Lovejoy

[57] ABSTRACT

Disclosed is a computer system which includes multiple levels of bootstrap code. The first level of bootstrap code is stored in a non-volatile storage means associated with a host processor. A second non-volatile storage means is provided which stores a second level of bootstrap code. A processor means, separate from the host processor, controls access by the host system to both the first and second non-volatile storage means. The second non-volatile storage means in the preferred embodiment is electrically writable and erasable by the host computer system, by the processor means associated with the second non-volatile storage means, or by an input device provided for that purpose.

11 Claims, 3 Drawing Figures

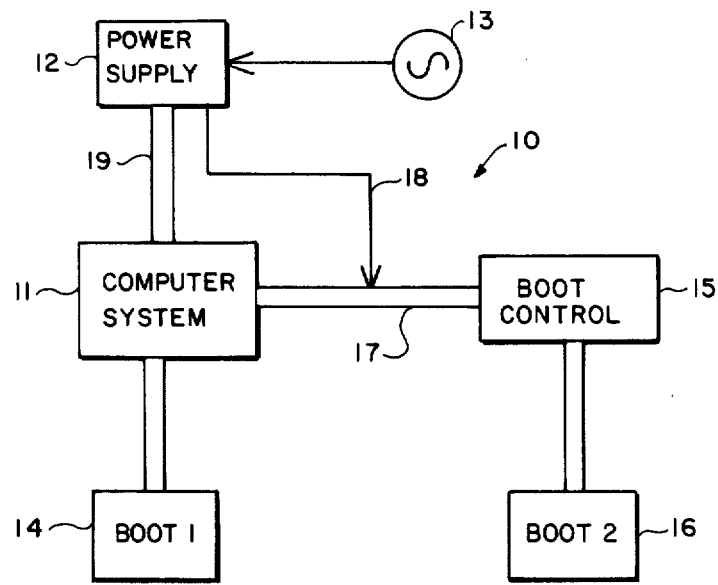
FIG_1
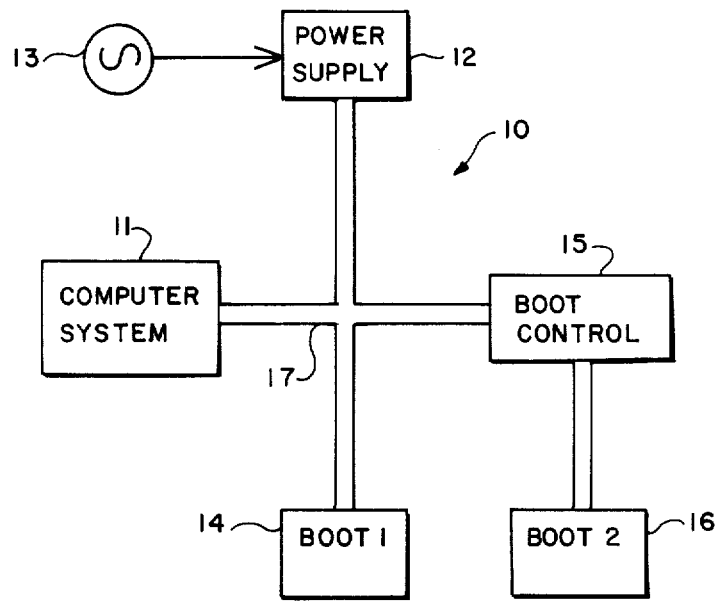
FIG_2

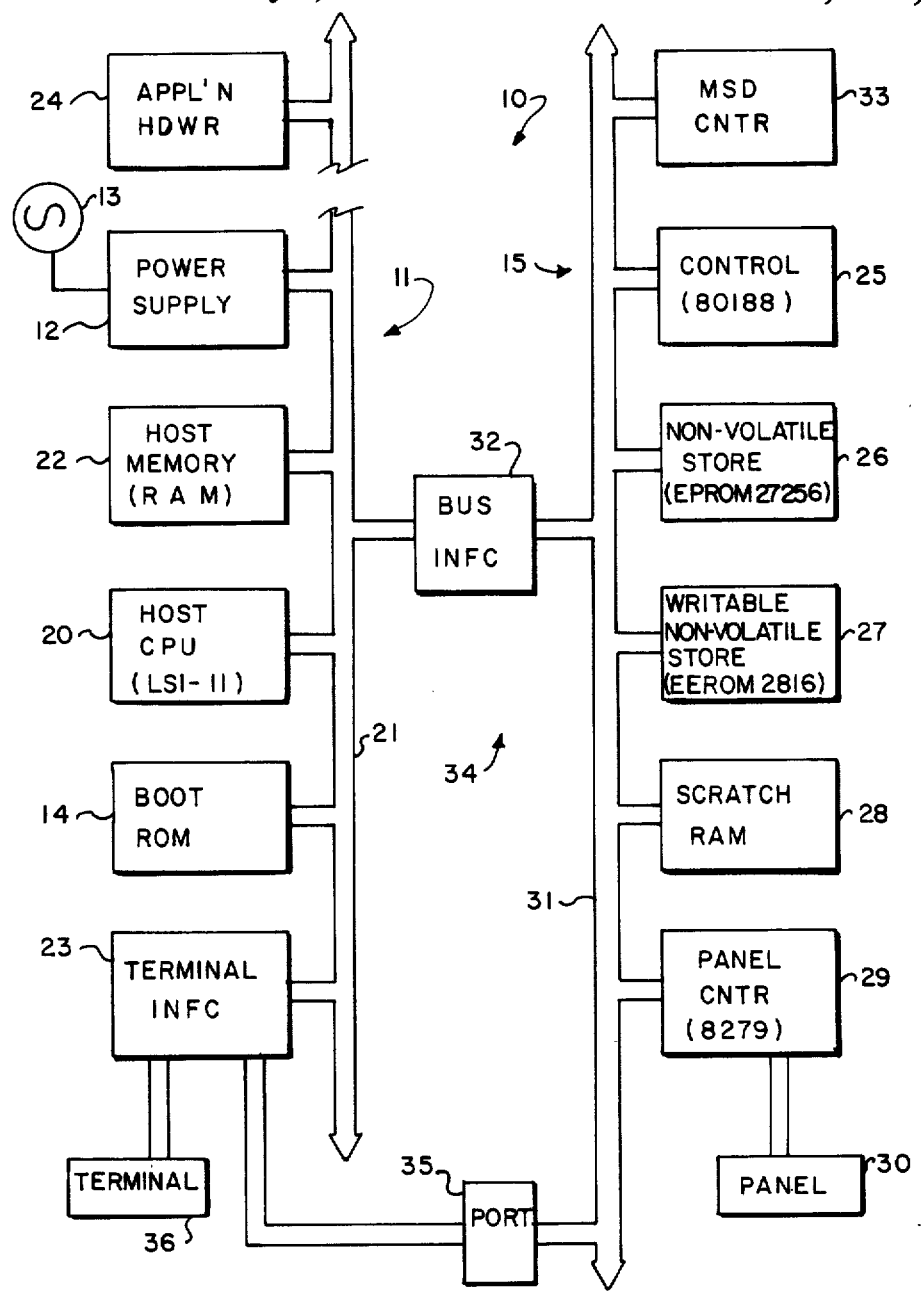
FIG_3

1

MULTILEVEL BOOTSTRAP APPARATUS

FIELD OF THE INVENTION

The present invention relates to an apparatus for initializing software control of a computer system, and for loading "bootstrap" code into the computer system to condition the system to operate under software control. Particularly, the present invention relates to a user-configurable, programmable apparatus for initializing software control of a computer system.

BACKGROUND OF THE INVENTION

Commonly, computer systems include a memory device such as a ROM or PROM on which bootstrap data, in the form of computer code, is stored in non-volatile form so that the bootstrap data is not lost when power goes off. When power for the computer system is turned on, the bootstrap data is loaded into the active processing parts of the computer system in order to condition the computer system to read software from an input device, such as a disk drive or other storage device, and to execute the software that it reads. Most commonly this bootstrap data is loaded automatically by the computer in response to an initialization signal generated when the computer is turned on or reset or, at other times, when the data stored in the bootstrap memory device is needed.

The bootstrap data typically includes data for configuring the computer system, the units connected on-line to the system and operating characteristics of those units, such as the bit rate or data protocols of a communication device. Also the bootstrap data may include code which conducts diagnostic routines on the computer system to assure that the system will run properly. Further, the bootstrap data includes code for loading operating systems software into the system from a storage device, such as a disk unit.

The prior art bootstrap memory devices typically are loaded with the bootstrap data during manufacture, or otherwise have the bootstrap datas inalterably fixed into the computer system. Thus, normally only the manufacturer of the computer system has control over the bootstrap data which is stored in the bootstrap memory device. Some users have particular applications which require additional or modified bootstrap data but prior art systems have prevented such users from efficiently adding or modifying bootstrap data. Such users generally have been required to allow the computer system to bootstrap itself using the original bootstrap data and then execute application software routines which change the configuring data, the diagnostic routines or other parameters under which the computer system operates. This approach is inflexible and cumbersome to accomplish.

Further, a user of a computer system who adds a particular hardware unit may desire configurable bootstrap data. For instance, a user may require diagnostic routines to be run on specific application hardware before software is accepted by the computer system. Alternatively, a user may add on additional processing units which require bootstrap data for communication with the host system. For some systems the user may need to configure the sequence of bootstrapping among various machines in the system.

Obviously, as the number of peripheral connections to separate machines grows, or the more specialized the function becomes, for a given computer system, the higher the probability that the bootstrap data provided with the host computer system will be inadequate.

Thus there is need for a user-configurable, programmable bootstrap device which allows for specialized functions or expansion of a computer system and flexibility in the bootstrap data for the computer system.

SUMMARY OF THE INVENTION

The present invention is a multilevel, configurable, programmable bootstrap apparatus for controlling the initialization of software control of a host computer.

A data processing apparatus according to the present invention comprises an initial means for generating an initial signal when bootstrapping is desired and a computer means fo processing data under software control. A first level of bootstrap data is stored in a first non-volatile boot storage means. A second level of bootstrap data is stored in a second non-volatile storage means. A control means responsive to the initial signal control access of the computer means to the first and second levels of bootstrap data. Means are provided for communicating data among the components of the data processing apparatus.

In a preferred embodiment, the second non-volatile storage means includes a controllable write means for writing data in at least a portion of the second storage means in response to control data. The control data is generated through the control means, the computer means, and/or, if desired, by an input device provided with the apparatus of the present invention.

Thus, a user is provided a means for programming or controlling the bootstrap data of the host computer system. In this manner, the cumbersome and inflexible approach to bootstrapping a computer system of the prior art is overcome according to the present invention.

BRIEF DESCRIPTION OF THE DRAWINGS

FIG. 1 is a simplified block diagram of one embodiment of the present invention.

FIG. 2 is a simplified block diagram of another embodiment of the present invention.

FIG. 3 is a more detailed diagram of a preferred embodiment of the present invention.

DETAILED DESCRIPTION

With reference to the figures, a detailed description of the preferred embodiment is provided. First, a simplified description of two systems embodying the present invention is given, then a more detailed specification of the implementation of one preferred embodiment of the present invention is described.

FIGS. 1 and 2 are simplified block diagrams employing reference numbers which are the same for similar parts of data processing apparatus 10 embodying the present invention.

As shown in FIG. 1, a typical data processing apparatus 10 embodying the present invention comprises a computer means 11 for processing data under software control. The computer means 11, although not shown in FIG. 1, will include, for instance, at least one central processing unit (CPU) and various input/output devices (I/O devices) all of which are interconnected by a bus system 17 such as the MULTIBUS (MULTIBUS is a trademark of Intel Corporation and a specification of the details of MULTIBUS can be obtained through Intel Corporation, 3065 Bowers Avenue, Santa Clara, Calif. 95051). The data processing apparatus 10 also includes a power supply 12 which provides power across line 18 to the data processing apparatus 10. The power supply 12 receives its power from a source 13 such as a commercial electric generating source.

Associated with the computer means 11 is a first store means 14 for storing a first level bootstrap data, designated "BOOT 1". For a typical computer means 11 which is interconnected through a MULTIBUS bus system 17, the first store means 14 will be connected directly to the central processing unit (not shown) of the computer means 11.

The data processing apparatus 10 also includes a boot controller 15 which comprises a microprocessor or other control means for controlling the configuration of bootstrap data for the data processing apparatus 10 as explained in more detail below. Associated with the boot controller 15 is a second store means 16 for storing a second level of bootstrap data, designated "BOOT 2".

The first and second levels of bootstrap data, BOOT 1 and BOOT 2, are received by the computer means 11 to initialize software control of the data processing apparatus 10 of the present invention. The apparatus 10 as shown in FIG. 1 typically includes an initial means (not shown) which monitors the power supply 12 and generates an initial (or initialization) signal across line 19 when the power supply 12 is turned on and reaches proper operating levels. When the initial signal is generated, the boot controller 15 will cause the computer means 11 to wait while the boot controller 15 configures the second level of bootstrap data, BOOT 2, in the second store means 16. The computer means 11 when allowed by the boot controller 15 to proceed to bootstrap, will default typically to a hardware designated address for receiving bootstrap data. In the preferred embodiment, when the boot controller 15 releases the computer means 11 to proceed to bootstrap, the computer means 11 will default to the address of the first store means 14 and begin loading BOOT 1. BOOT 1 will include sufficient data to enable the computer system 11 to receive and read BOOT 2 in the form which is provided by the boot controller 15 out of the second store means 16. In a MULTIBUS system (bus system 17), the first store means 14 will include BOOT 1 which will consist of bootstrap data fixed in ROMs or other non-volatile memory devices when the data processing apparatus 10 is manufactured. This fixed bootstrap data in BOOT 1 may be very complex, if desired, but is preferably quite simple. This allows the boot controller 15 and the second level of bootstrap data, BOOT 2, to provide the majority of the bootstrap data in a user-configurable, programmable adaptable form which is not fixed inalterably during manufacture of the data processing apparatus 10.

FIG. 2 shows a second typcial data processing apparatus 10 embodying the present invention. The apparatus 10 shown in FIG. 2 shows a simplified diagram of a data processing apparatus 10 which is interconnected using a bus system 17 such as Q-BUS (Q-BUS is a trademark of Digital Equipment Corporation and a specification of the details of Q-BUS can be obtained through Digital Equipment Corporation, 146 Main Street, Maynard, Mass. 01754). Typically a Q-BUS bus system 17 as shown in FIG. 2 will include a computer means 11 comprising an LSI-11 central processing unit and a number of I/O devices as discussed above with reference to FIG. 1. A power supply 12 supplies power to the data processing apparatus 10 over the Q-BUS bus system 17. The power supply 12 receives its power from a power source 13, such as a commercial electric generating source.

The first level of bootstrap data, BOOT 1, is stored in a first store means 14 which is associated with the Q-BUS bus system 17. The first store means 14 for the Q-BUS bus system 17 typically includes a 256-word ROM. If longer bootstrap data is desired in a Q-BUS bus system 17, several "pages" of bootstrap ROM in a 256-word-per-page format are required. This paging of bootstrap data required for complicated bootstrapping in a Q-BUS bus system 17 is a combersome system for loading bootstrap data because it requires hardwired support for the paging and software overhead to assure paging proceeds without flaw.

A boot controller 15 which comprises a microprocessor or other control means for controlling the loading of bootstrap data in the computer means 11 for initializing software control of the data processing apparatus 10 is also provided in FIG. 2. The second level of bootstrap data, BOOT 2, is stored in the second store means 16 which is associated with the boot controller 15. As discussed above with refernece to FIG. 1, the boot controller 15 configures the bootstrap data stored as BOOT 2 in the second store means 16.

FIGS. 1 and 2 show two different configurations for interconnecting the first store means 14 including the first level of bootstrap data, BOOT 1, with the data processing apparatus 10. In FIG. 1, the first store means 14 is associated with the central processing unit of the computer means 11, while in FIG. 2 the first store means 14 is interconnected with the computer means 11 across the bus system 17, such as a Q-BUS. As is known in the art, the first store means 14 including the first level of bootstrap data, BOOT 1, can be manufactured in a variety of ways which provide data communication between the computer means 11 and the first store means 14. The examples in FIGS. 1 and 2 are meant to show two common types of configurations. The boot controller 15 for both FIGS. 1 and 2 is programmed according to the present invention to recognize the configuration of the data processing apparatus 10 in order to control the loading of bootstrap data in the computer system 11 for initializing the software control of the data processing apparatus 10.

FIG. 3 shows a more detailed block diagram of a preferred embodiment of the present invention. The data processng apparatus 10, according to this embodiment of the present invention, includes a computer means 11 based on a host CPU 20 which is implemented with one of the LSI-11 series of processors manufactured by Digital Equipment Corporation. (A specification of the details of the LSI-11 series CPU is available through Digital Equipment Corporation, 146 Main Street, Maynard, Mass. 01754.) The computer means 11 is interconnected for data communication by a Q-BUS 21; the Q-BUS 21 as mentioned above is also supplied through Digital Equipment Corporation and is well suited for operation with the LSI-11 series of processors. Interconnected with the Q-BUS 21 is the power supply 12 which receives its power from a power source 13 such as a commercial electric generating source. Also connected to the Q-BUS 21 is a host memory 22 typically consisting of an array of RAM memory devices for use by the host CPU 20 in executing software. The first level of bootstrap code BOOT 1 is stored in a Boot ROM 14 which is connected to the Q-BUS 21. Also connected to the Q-BUS is a terminal interface 23 providing communication with a terminal 36 which consists of a CRT display and a keyboard for inputting and outputting data. As indicated in FIG. 3, the preferred embodiment of the data processing apparatus 10 includes application hardware 24. The application hardware 24 may be of any of a variety of peripheral units which are provided to adapt the host CPU 20 to perform a particular function desired by the user. The adaptability provided by the boot controller 15, also shown in more detail in Figure 3, allows the user to add a variety of application hardware 24 to the computer means 11. The application hardware 24 is connected to the Q-BUS 21 for data communication with the rest of the computer means 11 for the apparatus 10 shown in FIG. 3.

The boot controller 15 as shown in FIG. 3 includes a control means 25, such as the 80188 microprocessor supplied by Intel Corporation.

The boot controller 15 also includes two nonvolatile storage devices, a first non-volatile storage device 26 and a second writable non-volatile storage device 27. In the preferred embodiment, the first non-volatile storage device 26 is an EPROM, such as a 27256 supplied by Intel Corporation. The second writable non-volatile storage device 27 is a writable storage device, such as an EEPROM or other means which includes controllable write means for writing data in at least a portion of the device in response to control data. In the preferred embodiment, data may be both written and erased from the writable non-volatile storage device in response to the control data. The control data may be generated by the control means 25, the computer means 11 or an input device provided as described below. In the preferred embodiment, the control means 25 includes means for controlling access by the computer means 11 to the EEPROM and mean for writing data on the EEPROM writable non-volatile store 27 in response to data from the computer means 11 or the input devices described below. A suitable EEPROM is the 2816 supplied by Intel Corporation.

The boot controller 15 also includes in the preferred embodiment a Scratch RAM 28 for use by the control means 25 in executing code.

Further, a panel controller 29 and a panel 30 are provided. The panel controller, such as the 8279 supplied by Intel Corporation, is in communication with the control means 25, drives an input/ output panel 30 which is used to display operator menus and system status information and allow an operator to control a variety of parameters of operation of the data processing apparatus 10 using a set of input keys.

The parts of the boot controller 15 are interconnected for data communication by a bus means 31. A bus interface 32 provides communication between the bus means 31 and the Q-BUS 21 according to Q-BUS 21 specifications.

Also in the preferred embodiment the terminal interface 23 of the computer system 11 is connected directly to the bus means 31 of the boot controller 15 through a port 35 so that the terminal 36 may be used to input and output data directly with the boot controller 15.

An additional feature of the preferred embodiment is a mass storage device controller 33 which is also connected to the bus means 31 and derives its processing power from the control means 25.

The boot controller 15 together with the mass storage device controller 33 and the bus interface 32 are termed the foundation module 34 of the data processing apparatus 10. In the preferred embodiment for the foundation module 34 operating with a host CPU 20 which is one of the LSI-11 series, the Boot ROM 14 and the terminal interface 23 are also located physically on the board with the foundation module 34. However, because the Boot ROM 14 and the terminal interface 23 are connected with the Q-BUS 21, the Boot ROM 14 and the terminal interface 23 are shown in FIG. 3 in association with the computer means 11 of the data processing apparatus 10 for the purposes of clarifying the illustration. The embodiment shown in FIG. 3 is analogous to the simplified diagram shown in FIG. 2 as discussed above.

The first level of bootstrap code BOOT 1 is stored in the Boot ROM 14 in the embodiment shown in FIG. 3. The second level of bootstrap code BOOT 2 is stored in the first non-volatile store 26 and the second writable non-volatile store 27. Thus a portion of the second level of bootstrap code BOOT 2 is in a non-writable memory device, such as the EPROM of the non-volatile store 26. The second portion of the second level of bootstrap code BOOT 2 is user-configurable in the writable non-volatile store 27 EEPROM, or similar device. Thus during manufacture of the data processing apparatus 10, the Boot ROM 14 and the first non-volatile store 26 of the boot controller 15 are configured with bootstrap data or code in a permanent form. However, the second portion of the second level of bootstrap code BOOT 2 is stored in the writable non-volatile store 27. Thus the user of the data processing apparatus 10 is allowed to configure the bootstrapping of the data processing apparatus 10 to meet needs as they arise or as the system expands or contracts. Additional interaction with the bootstrapping of the data processing apparatus 10 is provided through the panel 20 or the terminal 23.

Thus the user of the data processing apparatus 10 is provided a foundation module 34 which will not become obsolete as the configuration or parameters of the data processing apparatus 10 change.

The operation of the LSI-11-based data processing apparatus 10 in FIG. 3 is now provided for a typical start-up sequence.

As the data processing apparatus 10 powers up, the power supply 12 charges up to reach normal operating voltages. After the power supply 12 stabilizes at normal operating voltages, the control means 25 through the initial means consisting of sensing circuitry (not shown) asserts a first signal, BDCOK, which indicates to the computer means 11 that the power supply is okay. The LSI-11 CPU 20 asserts across the Q-BUS 21 a signal which causes all of the attached peripherals to reset. At this time the LSI-11 under normal operation will begin to loop internally waiting for a second signal, BPOK, to be asserted by circuitry (not shown) which indicates that the power supply 12 has stored an acceptable level of backup power.

However, according to the present invention circuitry under the control of the foundation module 34 control means 25 holds the second signal unasserted. Thus the LSI-11 is kept in an internal loop while the foundation module 34 configures the bootstrapping of the data processing apparatus 10. The configuring of the bootstrapping is now described.

First, the control means 25 executes a standard initialization code for the particular hardware used to implement the control means 25, such as 80188 as shown in the FIG. 3. This standard initialization code can be derived from literature available with the particular hardware chosen. Testing procedures for the foundation module 34 are included in the initialization of the control means 25. Also, the display on the panel 30 is cleared to a selected status code for this first power up state.

The user may include control bits in the writable non-volatile store 27 which will cause the control means 25 to proceed next to execute a detailed series of tests of the foundation module 34 to assure proper operation. The bulk of the code controlling the series of tests executed at this time would be stored by the manufacturer during manufacture in the non-volatile store 26 in the preferred embodiment with the control bits triggering the tests stored in the writable non-volatile store 27. This intial test exercises the 81088 control means 25 and as much of the foundation module 34 circuitry as is directly associated with proper 80188 control means 25 and panel 30 operation. If an error is detected, the 81088 halts with interrupts disabled. This test executes in a short enough period of time that a system which has halted for an error will be immediately distinguishable from a normally starting system by noting that the initial panel 30 display contents are not replaced quickly after a power-up. Systems which fail this test will not run any further.

As testing proceeds, the pattern on the display panel 30 is regularly updated according to code storred in the non-volatile store 26 so that no more than one second elapses between observable displays of system progress. The detailed tests consist of a number of hard coded test routines specifically designed to test hardware sub-systems of the foundation module 34. Each of these routines is provided by the manufacturer. They are accessed in sequence as sub-tests and return either no error code to the display panel 30 if no hardware errors were detected by their execution, or an appropriate error Event Code otherwise. Errors detected are reported on the panel 30 and the operator is required to press a key on the panel to continue system initialization.

Next, parameters stored in the writable non-volatile store 27 are used to configure the hardware resident on the foundation module 34. The parameters include a number of parameters associated with the mass storage device controller 33 as well as with the serial port 35 for the terminal interface 23 communications on the system, and with the line-time clock (not shown).

At this stage, the control means 25 may read input provided through the panel 30 or the terminal 36 to intitiate a process to change parameters stored in the writable non-volatile store 27. If changes are indicated, the changes are executed in the foundation module 34.

In the preferred embodiment, if a control bit in the writable non-volatile store 27 is set, a test of the low address portion of the host memory 22 and the interface means 32 is conducted. The starting address of this test and the amount of the memory to be tested are parameters stored in the writable nonvolatile store 27 and thus may be set or modified during this initialization through the panel 30 or the terminal 23. The bulk of the code for this test stored in the first non-volatile store 26.

Once the testing of the foundation module 34 as configured by the user is completed, the control means 25 institutes a delay or other process to assure that the disk drives or other machines associated with the mass storage device controller 33 have spun up and stabilized. This process for assuring stabilization of the mass storage devices can be controlled by parameters set in the writable non-volatile store 27. Also a control bit in the writable non-volatile store 27 may be included to cause the control means 25 to execute a short read/write/read exercise on a disk drive through the mass storage device controller 33 on a reserved portion of a disk.

At the end of the initialization and confidence testing outlined above, a last power up status code is provided to the operator on the display panel 30. At this point, the initialization process as outlined above may be restarted in order to assure that all the tests were run properly, or the system may be directed to pause to await operator input by providing a prompt sequence, or the system may be allowed to proceed to bootstrap processing. The choice of what happens next, is controlled in the preferred embodiment by data stored in the writable non-volatile store 27.

When the system is allowed to proceed to bootstrap processing, either by operator prompting or through the control of code in the writable non-volatile store 27, the second signal, BPOK, is asserted by the control means 25 releasing the LSI-11 CPU 20 from its loop.

When the LSI-11 CPU 20 detects the assertion of of the second signal, it assumes one of four power-up modes. The four power-up modes are unimportant for this invention, except that for the preferred system the path chosen is Mode 2. This mode through hardware forces the LSI-11 program counter in the CPU 20 to a specific address, typically 773000 octal. This address is typically hardwired into the LSI-11 and directs it to a space in the LSI-11 CPU 20 I/O page that is reserved for a 256-word Boot ROM 14 space. This ROM space is located in the Boot ROM 14.

The Boot ROM 14 includes the first level of bootstrap data BOOT 1 according to the present invention. This first level of bootstrap data BOOT 1 is a short program which will fit in the 256-word page and is responsible for loading the second level of bootstrap data BOOT 2 stored in the foundation module 34 into address space in the host memory 22. The first level of bootstrap data BOOT 1 in the Boot ROM 14 initializes the interface between the LSI-11 CPU 20 and the foundation module 34. Once this is accomplished, a special command is executed to cause the foundation module 34 to read the second level of bootstrap data BOOT 2. The second level of bootstrap data BOOT 2 as read from the storage facilities described above is stored under direction of the code in the first level of bootstrap code BOOT 1 into the host memory 22. The first level of bootstrap code BOOT 1 in the Boot ROM 14 then directs the host CPU 20 to the address of the second level of bootstrap code BOOT 2 from the host memory 22.

A typical flow sequence for the first level of bootstrap code BOOT 1 stored in the Boot ROM 14 proceeds as follows:

1. Write the bus interface 32 registers I/O address to host memory 22 address 000000 octal to be used by the balance of this program.

2. Write the operator terminal interface 23 control registers I/O address to memory address 000002 octal to be used by the balance of this program. Code may be inserted here for storing manually entered bus interface 32, terminal interface 23 or other addresses.

3. Test the CPU 20 using standard techniques for the LSI-11.

4. Use the Q-BUS 21 time-out trap mechanism in the CPU-20 to determine the size of host memory 22 up to 32K words.

5. Print an initial sign-on message on the operator terminal 36.

6. Execute an initialization sequence for establishing communications with the mass storage device controller 33.

7. Initialize memory variables as needed.

8. Using standard mass storage device controller 33 protocol, issue the special command to the mass storage device controller 33 which requests that the three part BOOT 2 image be written to memory 22 starting at location 1000 octal. The command issued is nearly identical to a normal disk read or write command with three exceptions:
   a. It is identified via a unique value in one field of the memory-based command packet to be a command which is not normally used for disk data access.
   b. The command function specified in the command packet is a foundation module 34 to system memory 22 data transfer.
   c. The command packet fields normally used to specify a disk address from which to read data are replaced with unique values to specify that the second level of bootstrap data BOOT 2 image is to be transferred.

9. Using standard mass storage device controller 33 protocol, wait for the transfer to complete.

10. Jump to the second level of bootstrap code by executing a CPU JMP instruction to system memory 22 address 1000 octal.

To execute the special comman, the control means 25 builds a bootstrap program consisting of the second level of bootstrap data BOOT 2 in host memory 22 at the address specified (normally 1000Q) consisting of three segments. The first segment of 2 K bytes is LSI-11 code copied directly from first non-volatile store 26. The next 6K bytes in the in the first non-volatile store 26 are skipped for future expansion. Following this, a second segment including a 512 byte copy of the user supplied code is made from the writable non-volatile store 27. Finally, a third segment including a 128 byte configuration specification block from the writable non-volatile store 27 is copied after the user code to pass bootstrap configuration data to the bootstrap program.

Upon verifying the completion of the bootstrap program in the host memory 22, the LSI-11 CPU 20 transfers to the starting address specified (normally 1000Q) and begins executing the newly loaded code.

As described above, this second level of bootstrap data BOOT 2 is composed of three segments. The first segment is CPU 20 determined code which is permanently stored in the first non-volatile store 26. The contents of this first segment are derived from requirements of the CPU 20 chosen and can be developed through the manufacturer of the chosen CPU 20. The second segment is a direct copy of a block of user-supplied code for the LSI-11 CPU 20 which is stored by the user in the writable non-volatile store 27. This second segment in the preferred embodiment is a 512-byte block of code, the contents of which are completely specified by the user. The final segment of the second level of bootstrap is in the preferred embodiment a 128-byte block of control bits and parameters used as data by the first segment of code stored in the non-volatile store 26.

If desired, the second segment of BOOT 2 may also refer to the third segment for control bits or parameters. Typical parameters and control bits are:
   I. Parameters:
      Memory 22 test starting address
      Memory 22 test block length
      16-character ASCII bootstrap message for built-in front panel 30
      Disk cylinder address of first data read by 2nd level bootstrap BOOT 2
      Disk head number of first data read by 2nd level BOOT 2
      Disk sector number of first data read by 2nd level BOOT 2
      Starting system memory 22 address for data read by 2nd level BOOT 2
      Length of data block to be read by 2nd level
      Specifier of first disk drive to be tried by 2nd level BOOT 2
      Specifiers for subsequent drives to be tried by 2nd level BOOT 2
   II. Control bits:
      1—Automatic bootstrap without operator intervention
      0—Manual bootstrap as specified by terminal operator
      1—No error recovery allowed by bootstrap disk accesses
      0—Full error recovery enabled for bootstrap disk accesses
      1—Halt on fatal bootstrap disk error
      0—Transfer to manual bootstrap on fatal bootstrap disk error Errors encountered by the LSI-11 CPU 20 while attempting to read this second level of bootstrap code BOOT 2 are handled by code resident in the boot ROM 14 and cause the operator terminal 36 to display error codes.

Depending on the contents of the first and second levels of bootstrap code, certain tests of the LSI-11 CPU 20 and related hardware may be run. The systems's Q-BUS resident host memory 22 can be sized and tested, and some of the testing of peripheral equipment and application hardware 24 may be performed if desired by the user.

Following any initial testing, the mass storage device controller 33 will be directed to read system programs as determined by the bootstrap processing. Under control of the user-configurable, programmable bootstrap processing, loading by peripheral mass storage devices may either be done by operator prompting through the terminal 23 or other input device, such as panel 20, or through some predetermined order of devices contained in the bootstrap code itself. Thus the user may be enabled to select a particular mass storage device, such as a disk drive, from which to read an operating system or other software during initialization, rather than being required to default to a particular mass storage device determined by a hardwired boot ROM as required in the prior art.

In the preferred embodimnent, once a specific mass storage device has been selected, the code read from the non-volatile store 26 initializes communication with the mass storage device controller 33 for that mass storage device to prepare for an execute a read operation. The device address from which the data is to be read, the memory address to which it is to be stored, and the amount of data to be transferred are all parameters determined from the writable non-volatile store 27 in segment three of the second level of bootstrap data BOOT 2.

If the data chosen from the mass storage device is transferred without error, the final LSI-11 CPU 20 startup instructions in the bootstrap data transfer the control to the data retrieved from the mass storage device. From this point the first and second levels of bootstrap data BOOT 1, BOOT 2 are no longer used. The program transferred to memory from the mass storage device is typically a loader for the operating system programs. It reads the operating system in much the same way that the loader was read from the storage device and then transfers control to the operating system as the data processing apparatus 10 operation is taken over by the running operating system.

The operation of the embodiment shown in FIG. 3 has been explained in detail above. For other data processing apparatus 10, the sequence of steps may be altered to fit the hardware chosen.

It will be appreciated in the art, that the relative sizes of the first portion of the second level of bootstrap code BOOT 2 stored in the first non-volatile store 26 and the second portion of the second level of bootstrap code BOOT 2 stored in the writable non-volatile store 27 will be determined by the particular computer means 11 with which the foundation module 34 is operated. For the LSI-11-based computer means 11, the limitation in the size of 256 words of the host I/O page dedicated to the bootstrapping favors a larger first portion in the non-volatile store 26 so that the user may permanently include a large bootstrap code without the necessity of including paging hardware and software overhead required in the LSI-11-based systems for reading a detailed bootstrap code within the 256-work-per-page limitation. For a system based on a MULTIBUS, such as may be seen in a simplified form in FIG. 1, the size of the first portion of the second level of bootstrap code BOOT 2 may be reduced when the first level of bootstrap code stored in a boot storage device 14 is associated with the host CPU 20 which does not have the page size limitations of the LSI-11-based system. Thus a large, detailed first level of bootstrap code BOOT 1 may be included in the computer means 11 without the requirement of a second non-volatile storage device such as the non-volatile store 26 in the foundation module 34 shown in FIG. 3.

Also, for a system such as a MULTIBUS-based system, the data processing apparatus 10 may release the host CPU 20 to bootstrap processing earlier than in the Q-BUS system described above with reference to FIG. 3. Thus if the first level of bootstrap data BOOT 1 is a detailed and lengthy bootstrap code, the host CPU 20 may begin reading and processing that bootstrap code while the foundation module 34 generates the second level of bootstrap code BOOT 2 and writes it into the host memory 22.

The sequence of bootstrap processing is determined in part by the type of power-up signals provided in a particular computer system 11. It will be appreciated in the art that bootstrap processing may occur at times other than power up, thus the initial signal may be generated in a variety of ways, such as a reset, which is not generated by detecting the state of the power supply 12.

While the invention has been particularly shown and described with reference to the preferred embodiments thereof, it will be understood by those skilled in the art that various changes in form and details may be made therein without departing from the spirit and scope of the invention.

What is claimed is:

1. A data processing apparatus, comprising:

(a) computer means for processing data under software control;
   (b) first non-volatile storage means for storing a first level of bootstrap data;
   (c) second non-volatile storage means for storing a second level of bootstrap data;
   (d) initial means for generating an initilization signal;
   (e) control means, responsive to the initialization signal, for altering configuration data within said second level of bootstrap data in said second non-volatile storage means and for generating a release signal; and
   (f) hardware means in said computer means responsive to the release signal for causing said computer means to receiver said first and second levels of bootstrap data for initialization of software control of said computer means; and
   (g) bus means for interconnecting said computer means, said first non-volatile storage means, said second non-volatile storage means, said initialization means and said control means.

2. The apparatus of claim 1, wherein:
   said second non-volatile storage means includes writable storage means for storing at least one portion of said second level of bootstrap data, and means for writing data into said writable storage means in response to control signals; and
   said control means includes means for generating the control signals.

3. The apparatus of claim 2, including: input means, in communication with said control means, for providing input to control the configuration data alteration of the second level of bootstrap data.

4. The apparatus of claim 3, including: display means for displaying system status information during the configuration data alternation of said second level of bootstrap data.

5. The apparatus of claim 2, wherein: said computer means includes an input/ output terminal in communication with said control means for providing input to control the configuration data alternation of said second level of bootstrap data.

6. The apparatus of claim 1, wherein: said first level of bootstrap data includes code sufficient for said computer means to receive said second level of bootstrap data.

7. The apparatus of claim 6, wherein:
   said second level of bootstrap data includes a first segment of code adapted for general functions of said computer means;
   a second segment of code adapted for specialized functions of said computer means; and
   a third segment of configuration data code for control bits and parameters used by the first segment of code.

8. The apparatus according to claim 1, wherein
   said second non-volatile storage means includes controllable write means for writing data into at least one portion of said second non-volatile storage means in response to control data; and
   said computer means includes means for generating said control data.

9. The apparatus according to claim 1, wherein:
   said second non-volatile storage means includes controllable write means for writing data into at least one portion of said second non-volatile storage means in response to control data; and including input means, connected with said bus means, for generating said control data.

10. A data processing apparatus, comprising:
(a) computer means for processing data under software control;
(b) first non-volatile storage means for storing a first level of bootstrap data;
(c) second non-volatile storage means for storing a second level of bootstrap data including writable storage means for storing at least one portion of said second level of bootstrap data, and means for writing data into said writable storage means in response to control signals;
(d) initial means for generating an initialization signal;
(e) control means responsive to the initialization signal, for altering configuration data of said second level of bootstrap data in said second non-volatile storage means and for generating a release signal and generating the control signals;
(f) input means in communication with said control means for providing input to control the configuration data alteration of the second level of bootstrap data;
(g) hardware means, within said computer means responsive to said release signal, for enabling said computer means to receive said first and second levels of bootstrap data for initialization of software control of said computer means; and
(h) bus means for interconnecting said computer means, said first non-volatile storage means, said second non-volatile storage means, said initial means, and said control means.

11. The apparatus of claim 10, wherein:
said first level of bootstrap data includes code sufficient for said computer means to receive said second level of bootstrap data; and
said second level of bootstrap data includes a first segment of code adapted for general functions of said computer means; a second segment of code adapted for specialized functions of said computer means; and a third segment of configuration data code for control bits and parameters used by the first segment of code.

* * * * *